(12) United States Patent
Dolinsky et al.

(10) Patent No.: US 9,983,979 B1
(45) Date of Patent: May 29, 2018

(54) OPTIMIZED DYNAMIC MATRIXING OF SOFTWARE ENVIRONMENTS FOR APPLICATION TEST AND ANALYSIS

(71) Applicant: VCE Company, LLC, Richardson, TX (US)

(72) Inventors: Todd Jason Dolinsky, Chapel Hill, NC (US); Matthew Kevin Kerbawy, Youngsville, NC (US); Matthew John Molner, Cary, NC (US); Jeffery C. Cheng, Raleigh, NC (US)

(73) Assignee: VCE IP Holding Company LLC, Richardson, TX (US)

( * ) Notice: Subject to any disclaimer, the term of this patent is extended or adjusted under 35 U.S.C. 154(b) by 716 days.

(21) Appl. No.: 14/539,642

(22) Filed: Nov. 12, 2014

(51) Int. Cl.
*G06F 9/44* (2018.01)
*G06F 11/36* (2006.01)

(52) U.S. Cl.
CPC ............................... *G06F 11/3664* (2013.01)

(58) Field of Classification Search
None
See application file for complete search history.

(56) References Cited

U.S. PATENT DOCUMENTS 9,436,725 B1 * 9/2016 Aithal ...................... G06F 9/50

* cited by examiner

*Primary Examiner* — Qamrun Nahar
(74) *Attorney, Agent, or Firm* — Womble Bond Dickinson (US) LLP

(57) ABSTRACT

A method for matrixing of software environments is provided. The method includes receiving a selection of a plurality of aspects of a task environment for an application and executing the application in a task environment selected from a set of all possible combinations. The method includes selecting a next task environment from the set of all possible combinations, based on a result of executing the application in the task environment and reducing a matrix search scope, responsive to a failure in the executing the application in the task environment. The method includes repeating the executing, the selecting and the reducing until one of the matrix search scope as reduced, is less than or equal to a completed search scope, or the set of all possible combinations of the plurality of aspects of the task environment is in the completed search scope.

20 Claims, 6 Drawing Sheets

US 9,983,979 B1

OPTIMIZED DYNAMIC MATRIXING OF SOFTWARE ENVIRONMENTS FOR APPLICATION TEST AND ANALYSIS

BACKGROUND

The creation and maintenance of a matrix of test environments is a very important aspect of the software development process. Software products are often supported on an array of platforms, with differing versions of libraries, operating systems or various other components. As the number of variables and options increases, enumerating all potential combinations of possible end-user environments becomes exponentially impractical. As a result, organizations must choose to limit the scope of their testing to cover as many combinations of end user environments as possible. However, the unknown or untested combinations of end user environments may encounter defects or vulnerabilities.

SUMMARY

Embodiments of a system, a device and an apparatus are provided. In some embodiments, a method for matrixing of software environments is provided. The method includes receiving a selection of a plurality of aspects of a task environment for an application and executing the application in a task environment selected from a set of all possible combinations of the plurality of aspects of the task environment. The method includes selecting a next task environment from the set of all possible combinations of the plurality of aspects of the task environment, based on a result of executing the application in the task environment and reducing a matrix search scope, responsive to a failure in the executing the application in the task environment. The method includes repeating the executing, the selecting and the reducing until one of the matrix search scope as reduced, is less than or equal to a completed search scope, or the set of all possible combinations of the plurality of aspects of the task environment is in the completed search scope.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A method and related system for optimized dynamic matrixing of software environments for application test and analysis are discussed below. The embodiments enumerate all possible combinations of an input variable set and automatically generate every test environment. The system can dynamically create the appropriate environment, run a selection of automated commands, and destroy the environment on completion of running the automated commands when applicable. In some embodiments the environment is saved and may be utilized for a subsequent test. Moreover, the system can provide intelligent optimizations at scale to ensure that the complete suite of test environments, or a reduced suite of test environments in case of failure, is run efficiently to save time, cost, and complexity. This results in a shift from believing that an application is supported on a corner case environment to knowing that the application is supported.

Figure 1:
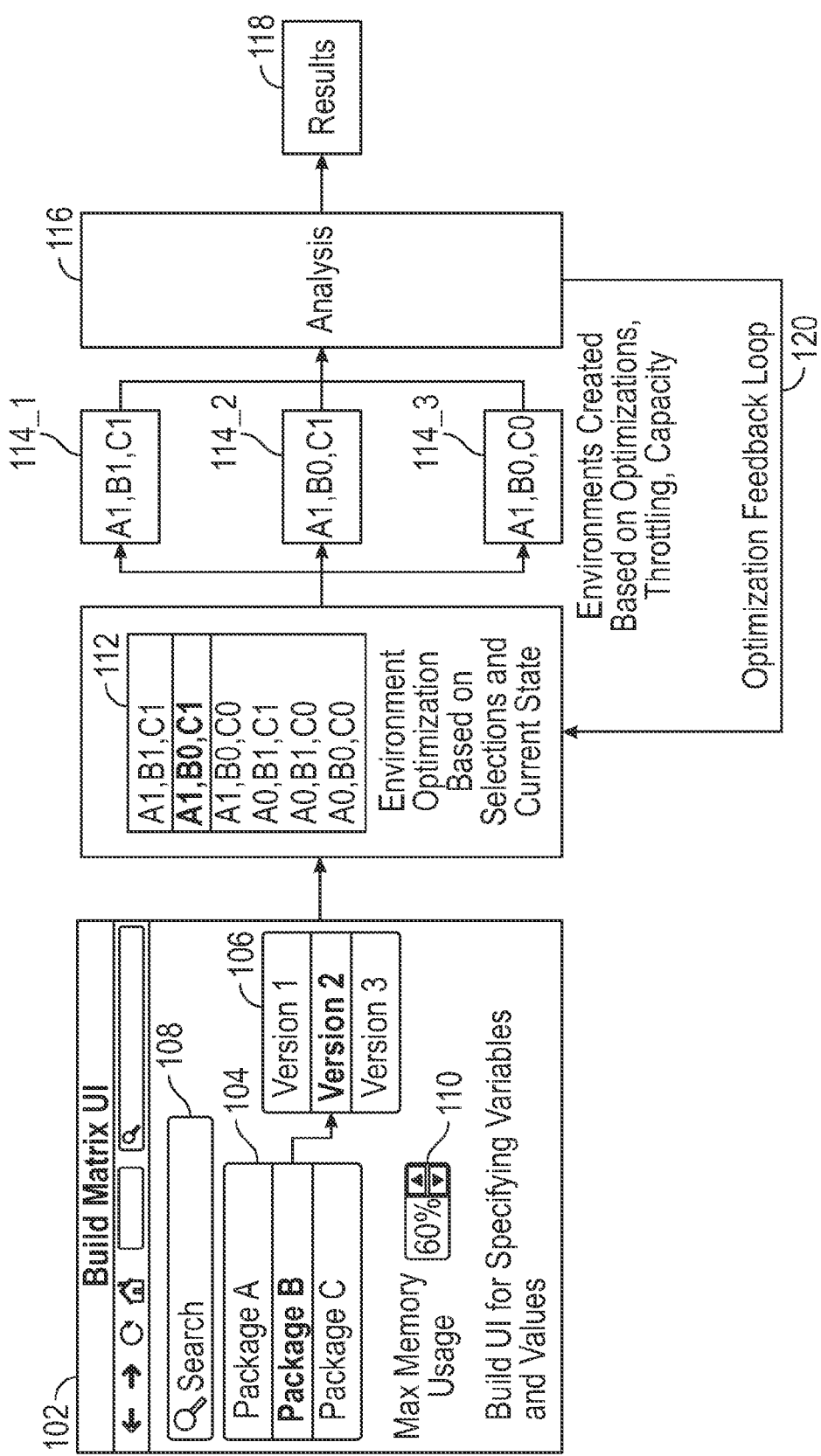
FIG. 1 is a process diagram showing selection of aspects of a task environment and execution of an application in various task environments, with analysis and an optimization feedback loop, in accordance with some embodiments.

FIG. 1 is a schematic diagram illustrating selection of aspects of a task environment 114 and execution of an application in various task environments 114-1, 114-2, 114-3, with analysis module 116 and an optimization feedback loop 120, in accordance with some embodiments. A user interface 102 guides the user in making various selections, to set up the combinations of task environments 114-1 through 114-3 for the application. The user interface 102 is by way of example and shows generic examples of aspects of the task environment. Further embodiments of the user interface 102, such as various graphical user interfaces and/or command line interfaces are readily devised in accordance with the teachings herein. A user can select from among multiple variable components, with each component having one or more values. Examples of components could be libraries, base operating systems, installed patches, file versions, browser types or versions, etc. The system then optimizes a plan for creating each and every test environment based on one or more optimization criteria as described in more detail below. This optimization can take place with the initial setup of the task environment(s) 114-1 through 114-3, and can further take place with the optimization feedback loop 120. The process iterates with creation or allocation of task environments, execution of the application in each task environment 114-1 through 114-3 (in serial and/or parallel operation), and continual optimization based on results. At the end of a run, a user has a complete picture of whether or not the application is supported across all possible task environments.

In the example shown in FIG. 1, the user selects packages A, B and C from a first list 104, and selects two versions of each package from a second list 106. A search box 108 is available to assist the user in finding applicable aspects of task environments 114. A throttle control 110 allows the user to select an amount of throttling to be applied to the task environments 114, such as a maximum memory usage (e.g., of 60% as shown in this embodiment). Combinations 112 of aspects of the task environment 114-1 through 114-3 are generated. In some embodiments, the combinations 112 are in the form of an exhaustive list of all possible combinations of the selected aspects of the task environment. Examples of aspects of task environments, and combinations thereof, are discussed below. Continuing with the example shown in FIG. 1, three task environments 114-1, 114-2, and 114-3 are then created for execution of the application in parallel. These three parallel task environments 114-1 through 114-3 are created based on optimizations, throttling and capacity, in some embodiments. In further examples, a single task environment could be created for serial testing, or other numbers of task environments could be created for parallel testing. The application is deployed into each of the task environments 114-1 through 114-3, and executed. In examples where multiple task environments, e.g. the three task environments 114-1, 114-2, and 114-3, are created alongside one another, the application executes in parallel across the multiple task environments. That is, an instantiation of the application executes in each task environment 114-1 through 114-3.

Still referring to FIG. 1, the task environments 114-1 through 114-3, and execution of the application in each task environment are monitored. Based on the monitoring, the analysis module 116 determines whether the application passes or fails in execution in each task environment 114, and determines what errors occur in cases of failure. Pass or fail, and errors, or lack of errors, are reported in the results 118. Results 118 could be in the form of one or more messages and/or a report, in various formats. Analysis module 116 also performs optimization, and provides guidance in the form of the optimization feedback loop 120. The optimization feedback loop 120 is then applied to the selection of the next task environment(s) 114. In this manner, execution of the application in one or more task environments 114 is iterated, with the task environment(s) changing each time through the iterative loop. In situations where there is a failure of the application in one or more task environments 114, the method and system can reduce the scope of the matrix search, by culling or pruning based on results of executing the application in the task environment. The culling or pruning is optional based on user preferences in some embodiments. The iterations then continue with a reduced matrix search scope. When there is no failure of the application, the iterations continue with the full matrix search scope until all possible combinations 112 have been tested, i.e., until the application has been executed on all possible task environments 114 based on the user selection.

In an example scenario provided for illustrative purposes provided to further explain the embodiments, the first version of an application has been released, and a software team is working on an update. Three (referred to as "A", "B", and "C") of open source libraries have been updated after the initial software release of the application. The development team would like to know if including those updates will cause the product to function incorrectly, or if a specific combination leads to decreased performance. Since there are only three items, the following test environments could be manually created for every possible combination of updates as listed in TABLE 1 below:

TABLE 1

| 1 combination with no changes: [ ] |
| 3 combinations with 1 changes: ['A', 'B', 'C'] |
| 3 combinations with 2 changes: ['AB', 'AC', 'BC'] |
| 1 combination with 3 changes: ['ABC'] |

8 Total Combinations

Seven new environments is not a relatively large number, and might be worth the one-time cost to do this work manually. However, for an example where the number of updated libraries is 10 (A, B, C, D, E, F, G, H, I, and J), the number of task environments for manually testing every possible combination becomes unmanageable in a manual environment. TABLE 2 provides the number of possible combinations:

TABLE 2

| 1 combination with no changes: [ ] |
| 10 combinations with 1 changes: ['A', 'B', 'C', 'D', 'E', 'F', 'G', 'H', 'I', 'J'] |
| 45 combinations with 2 changes: ['AB', 'AC', 'AD', 'AE', 'AF', 'AG', 'AH', 'AI', 'AJ', 'BC', 'BD', 'BE', 'BF', 'BG', 'BH', 'BI', 'BJ', 'CD', 'CE', 'CF', 'CG', 'CH', 'CI', 'CJ', 'DE', 'DF', 'DG', 'DH', 'DI', 'DJ', 'EF', 'EG', 'EH', 'EI', 'EJ', 'FG', 'FH', 'FI', 'FJ', 'GH', 'GI', 'GJ', 'HI', 'HJ', 'IJ'] |
| 120 combinations with 3 changes: ['ABC', 'ABD', 'ABE', . . . 'HIJ'] |
| 210 combinations with 4 changes: ['ABCD', 'ABCE', 'ABCF', . . . , 'GHIJ'] |
| 252 combinations with 5 changes: ['ABCDE', 'ABCDF', 'ABCDG', . . . , 'EGHIJ', 'FGHIJ'] |
| 210 combinations with 6 changes: ['ABCDEF', 'ABCDEG', . . . , 'EFGHIJ'] |
| 120 combinations with 7 changes: ['ABCDEFG', 'ABCDEFH', . . . , 'CEFGHIJ', 'DEFGHIJ'] |
| 45 combinations with 8 changes: ['ABCDEFGH', 'ABCDEFGI', . . . , 'CDEFGHIJ'] |
| 10 combinations with 9 changes: ['ABCDEFGHI', 'ABCDEFGHJ', 'ABCDEFGIJ', 'ABCDEFHIJ', 'ABCDEGHIJ', 'ABCDFGHIJ', 'ABCEFGHIJ', 'ABDEFGHIJ', 'ACDEFGHIJ', 'BCDEFGHIJ'] |
| 1 combination with 10 changes: ['ABCDEFGHIJ'] |

1024 Combinations

In this example there are 1024 ($=2^{10}$) possible combinations, where each library has one new version. Consider further the possibility that libraries could have multiple versions. If each of the 10 libraries above had two new versions rather than just one (i.e., three total possibilities for each, the two new updates and the existing version), the total number of possible combinations of task environments reaches 59049 ($=3^{10}$).

While further examples are readily devised, the above example identifies the core issue and the exponential nature of the problem. Real world examples include any component that has variability and can be combined with other features, whether the example includes libraries, base operating system, installed patches, updates, file versions, browser type, browser version, Resource availability (limited memory/CPU systems), actual hardware resource type (e.g. x64 vs x86 vs ia64), localized environment (e.g. English vs Japanese), or other item or aspect of a task environment.

Figure 2:
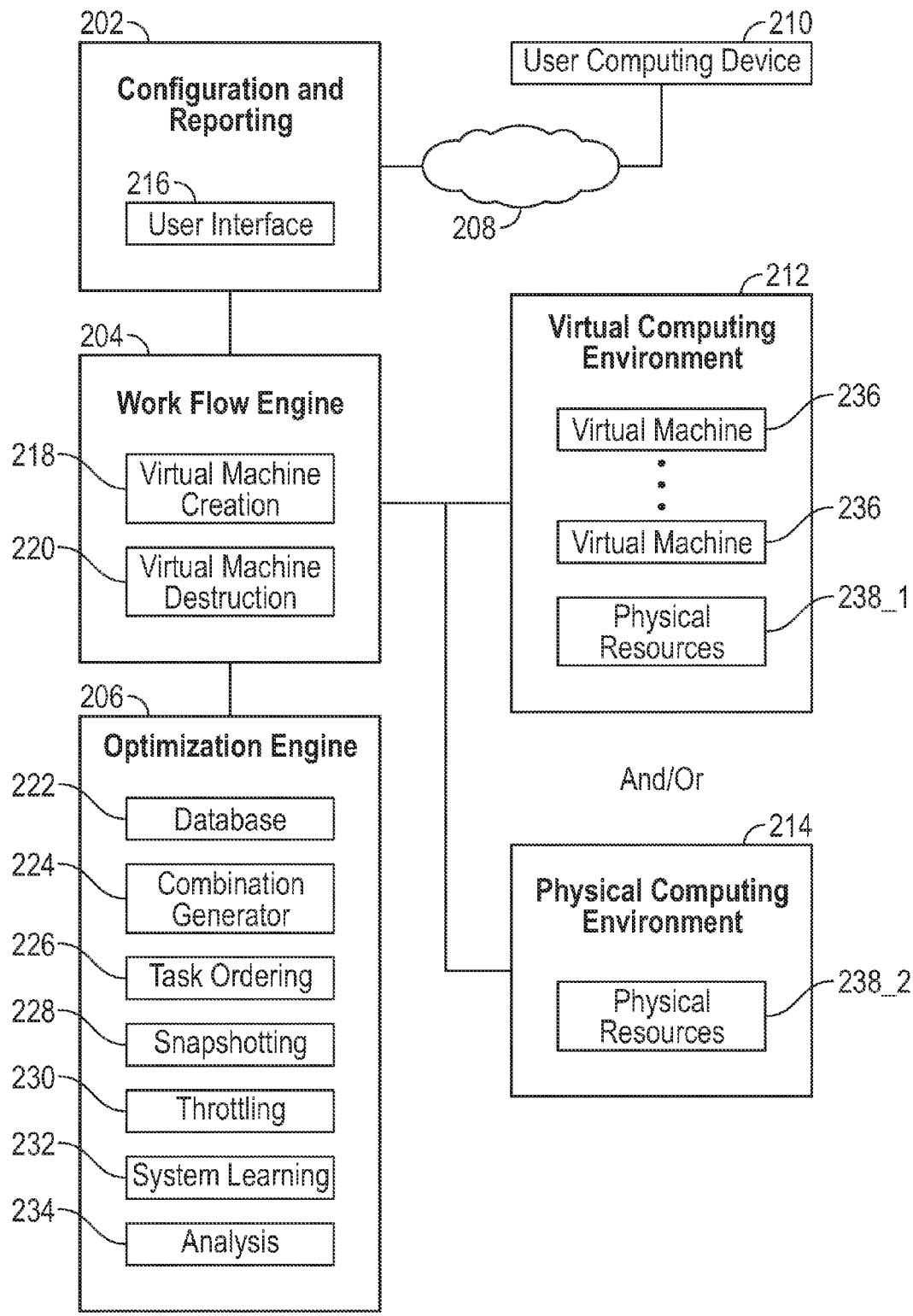
FIG. 2 is a system diagram of a configuration and reporting module, a workflow engine and an optimization engine, interacting with a user computing device and a computing environment in accordance with some embodiments.

FIG. 2 is a system diagram of a configuration and reporting module 202, a workflow engine 204 and an optimization engine 206, interacting with a user computing device 210 and a computing environment 212, 214 in accordance with some embodiments. The configuration and reporting module 202 is for communication with a user. The workflow engine 204 creates and manages task environments. The optimization engine 206 implements at least a portion of the optimization feedback loop 120, and guides, directs or otherwise assists the workflow engine 204 in selection of the next task environment(s) during iterations. The configuration and reporting module 202, workflow engine 204 and optimization engine 206 could be implemented in a computing device such as a server or a network appliance. Alternatively the module and engines could be implemented as software executing on a processor of the computing device, or as hardware or firmware, or combinations thereof, in various embodiments. The user computing device 210 communicates with a user interface module 216 of the configuration and reporting module 202 via a network 208 or other connection. The network 208 could be the global communication network known as the Internet, or an intranet, or other network.

The workflow engine 204 communicates with a virtual computing environment 212 and/or a physical computing environment 214, for implementation of the task environments 114 shown in FIG. 1. For example, the task environments 114 could be created in virtual machines 236 implemented from physical resources 238-1 in the virtual computing environment 212. This is accomplished by creating one or more virtual machines 236, provisioning each virtual machine 236 with the appropriate operating system and version, library or libraries and version or versions, etc., according to the task environment 114 of interest, and loading the application into each virtual machine 236. In some embodiments the task environments could be created by allocating physical resources 238-2 in the physical computing environment 214. These physical resources 238-2 could have some of the various operating systems and versions or libraries and versions already installed, so that the systems can be allocated efficiently. Alternatively, operating systems, versions, libraries and versions could be loaded into each system in a process analogous to the provisioning of the virtual machines 236. Snapshotting could also be applied to various parts of the cycle in some embodiments. The configuration and reporting module 202 is responsible for receiving user selection of which aspects of a task environment are to be applied in the matrix search scope. The user selects the aspects of the task environment via the user interface generated by the user interface module 216.

In one embodiment, the configuration and reporting module 202 has the user interface module 216 as a guided interface written using existing interface technologies such as HTML5 (hypertext markup language, version 5) or JavaScript, etc. In various embodiments, the configuration and reporting module 202, or solely the user interface module 216, is implemented as a plug-in on top of existing frameworks, e.g., a Jenkins plug-in that utilizes existing matrixing functionality. The configuration and reporting module 202 is further responsible for issuing alerts and reports. These alerts and reports can be in the form of messages, files and/or information displayed via the user interface module 216. Upon receiving an alert in the midst of testing, a user could decide to stop the testing, for example to perform debugging or revise software. Upon receiving a report, the user could determine a new strategy for testing a subset of the task environments, or decide to revise the application, etc.

Still referring to FIG. 2, the workflow engine 204 orchestrates actions to take using relevant technology for the task environments 114. In one embodiment of the workflow engine 204, a virtual machine creation module 218 interacts with the virtual computing environment 212 to create virtual machines 236. A virtual machine destruction module 220 interacts with the virtual computing environment 212 to destroy (i.e., tear down, deallocate or decommission) virtual machines 236. For example, Python and vSphere APIs (application programming interfaces) could be used to dynamically create and destroy virtual machines 236. Alternatively, other orchestration tools could be leveraged to provide this functionality. In further embodiments, an allocation module and a deallocation module could be devised to allocate and deallocate physical resources 238-2 in the physical computing environment 214.

The optimization engine 206 includes algorithms to determine the optimal next step to take based on various optimization options which are further discussed below. The algorithms could be developed in various programming languages. In some embodiments, the optimization engine 206 includes a database 222, which is used for storing historical results, and for analysis of the historical results and the building of statistics. A combination generator module 224, in the optimization engine 206, generates combinations of the selected aspects of the task environments. For example, the combination generator module 224 could receive the selected aspects from the configuration and reporting module 202, and generate an exhaustive list of all possible combinations of aspects of the task environment 114. This list could be passed to the database 222, and the virtual machine creation module 218 could consult the database 222 when implementing task environments.

A task ordering module 226 in the optimization engine 206 can select task environments and determine in which order the task environments should be created. For example, the task ordering module 226 could determine a pattern of failures in the execution of the application in the task environments, and reduce the matrix search scope by culling or pruning. The task ordering module 226 can cooperate with the system learning module 232 and/or the analysis module 234, to start with an "all packages updated" environment. Then, if a test fails, the task ordering module 226 could select one path (e.g., concentrating on combinations that employ a particular aspect) and implement a "divide and conquer" algorithm so that the system learning module 232 or the analysis module 234 can determine a root cause of failure. It should be appreciated that this mechanism would be more efficient than choosing task environments randomly or using a pre-ordered list.

Continuing with FIG. 2, a snapshot module 228, in the optimization engine 206, can use snapshots to revert to clean environments. For example, rather than performing a complete creation and destruction of task environments in each iteration, the system could load a specified aspect into a task environment, then perform a snapshot. The system could then continue loading further aspects into the task environment, possibly performing additional snapshots. In a subsequent iteration, the system can revert to one of the snapshot versions of the task environment, saving time as compared to starting from an uninitialized environment and reloading the specified aspect or aspects. This mechanism improves efficiency with initial environmental setup, and optimizes the necessary execution set by returning to a particular moment in time, and respective configuration, from prior testing. Since execution time per iteration is reduced, overall execution time is reduced.

A throttling module 230, in the optimization engine 206 of FIG. 2, allows the user to specify a limit of how many virtual machines 236 or a percentage or other ratio of physical resources 238-1, 238-2 could be consumed at any time (e.g., during each iteration). For example, setting a limit of 60% memory usage (as shown in the throttle control 110 in FIG. 1) would allow multiple virtual machines 236 to be created and destroyed in parallel without tying up all of the physical resources 238-1. The system could expand and shrink (in terms of creation of virtual machines 236 and provisioning thereof) to fit the available resources up to the specified limit. The remainder of the resources would then be available for other computing usage. A throttling limit could be set in terms of numbers of virtual machines 236, amounts of resources, or ratios of resources as compared to a total amount of resources, etc.

A system learning module 232, in the optimization engine 206, couples to the database 222. The system learning module 232 can identify which task environments require more resources than others, based on past runs. The system learning module 232 can then pick task environments for parallel creation by the virtual machine creation module 218, in order to fit the available load as specified by the throttling module 230. The system learning module 232, in some embodiments, can cooperate with the task ordering module 226 in order to set initial selection of task environments 114, based on past runs with the same or other applications, or set pruning or culling objectives for the task ordering module 226 to perform during iterations based on current runs of the application. The system learning module 232, on its own or in partnership with the analysis module 234, can examine packages for files in common to limit search scope or identify potential conflicts early on in some embodiments. This mechanism is applicable to scenarios with multiple shared libraries, and may be applicable in further scenarios.

The analysis module 234, in the optimization engine 206, can gather performance data. For example, certain versions of a library may lead to lesser system performance than others. This data could drive workload sizing or lead to investigations as to root causes and identification of improvements for a software release. The analysis module 234 could analyze power requirements, memory sizing requirements, throughput, performance metrics and so on for the application in the various task environments. It should be appreciated that this mechanism provides an aspect of load testing into the functional testing, with little effort by the user.

Figure 3:
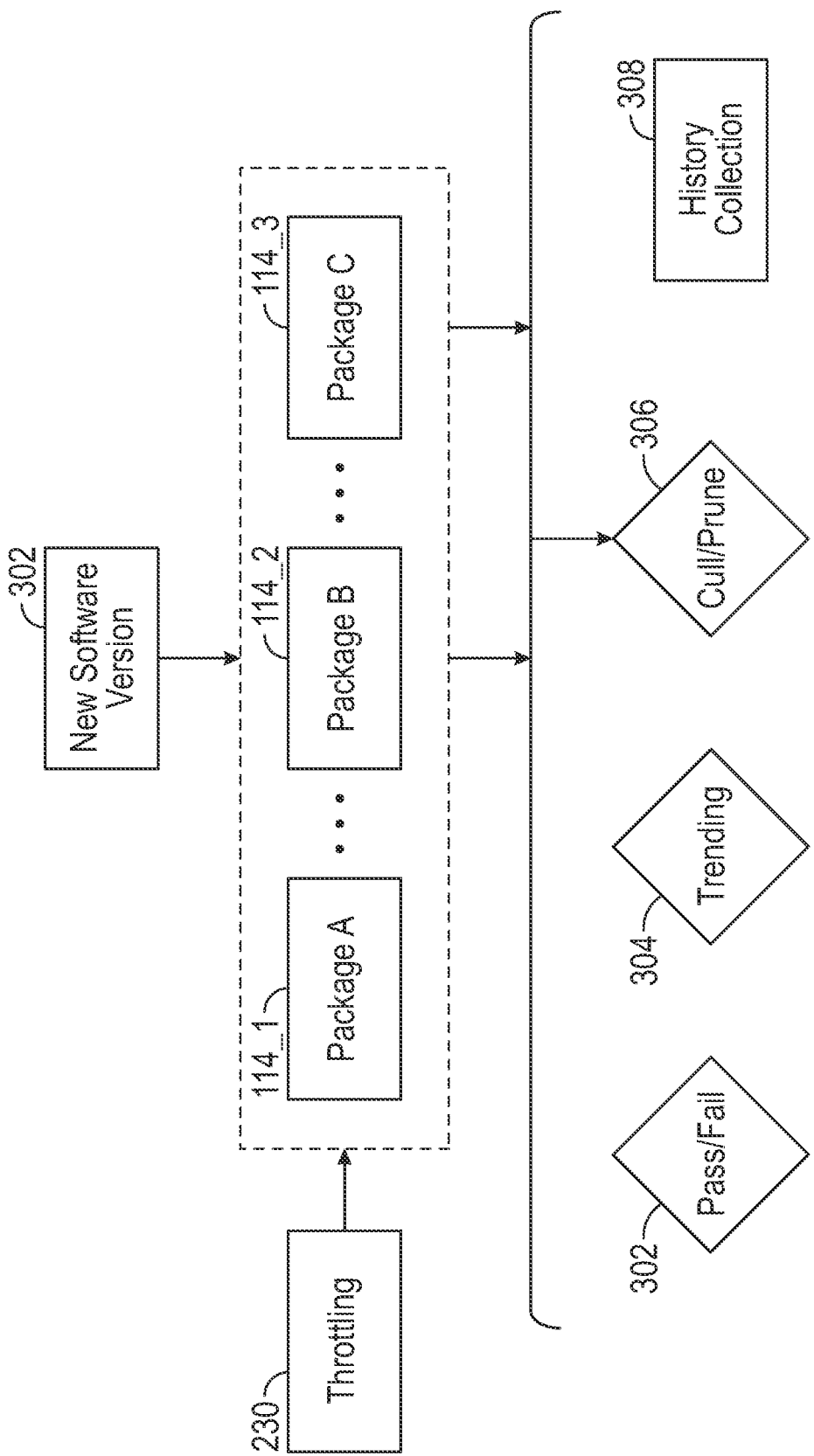
FIG. 3 is a process interaction diagram showing an example of a new software version executing in various task environments, as controlled by a throttling module, with participation by various processes from the system of FIG. 2 performing analysis and optimization as shown in FIG. 1 in accordance with some embodiments.

FIG. 3 is a schematic diagram illustrating an example of a new software version 302 executing in various task environments 114-1, 114-2, 114-3, as controlled by a throttling module 230, with participation by various processes from the system of FIG. 2 performing analysis and optimization as shown in FIG. 1. Referring to FIGS. 1-3 in this example, the new software version 302 is the application being tested in the task environments 114-1, 114-2, 114-3. The throttling module 230 sets the resource limits, and the virtual machine creation module 218 creates sufficient numbers of virtual machines 236 and provisions them with the appropriate operating system version, library version and other aspects of the task environments 114-1, 114-2, 114-3, keeping within the resource limits. The limits are set according to the output of the combination generator module 224 as ordered by the task ordering module 226 and stored in the database 222 in some embodiments. The virtual machine creation module 218 installs the application in each of the task environments 114-1, 114-2, 114-3, e.g., in the appropriate virtual machines 236 in the virtual computing environment 212 or the appropriate physical resources 238-2 in the physical computing environment 214.

A pass/fail process 302 could be owned by the system learning module 232 and/or the analysis module 234. The pass/fail process 302 monitors the application on each of the task environments 114-1, 114-2, 114-3, i.e., in "package A", "package B" and "package C", and observes whether the application passes or fails. A trending process 304 could be owned by the system learning module 232 and/or the analysis module 234. The trending process 304 monitors the application as above, and determines applicable trends. For example, a trend could be that the application tends to fail on combinations of aspects that have a particular revision of a particular operating system, or a particular revision of a particular library. This trending information can be documented in the database 222, so that the task ordering module 226 can make use of it.

A cull/prune process 306 could be owned by the system learning module 232, the analysis module 234 and/or the task ordering module 226, and cooperate with the trending process 304. The cull/prune process 306 culls or prunes paths in the matrix search scope, based on results of executing the application. For example, if the trending process 304 observes the application tending to fail on combinations of aspects that have a particular revision of a particular operating system, the cull/prune process 306 could remove combinations of aspects that have that particular operating system revision. By removing those combinations, so that the application does not get further tested on combinations that have that particular operating system revision, the cull/prune process 306 reduces the matrix search scope. Similar examples can be applied to various aspects of the task environments. A history collection process 308 could be owned by the system learning module 232. The history collection process 308 monitors execution of the application as above, and posts relevant data about the application and the task environments in the database 222. This history information can then be accessed by the analysis module 234, the system learning module 232, the throttling module 230, the task ordering module 226 and others as relevant to an embodiment. In some embodiments the history may be displayed directly to the user in the reporting module.

Figure 4:
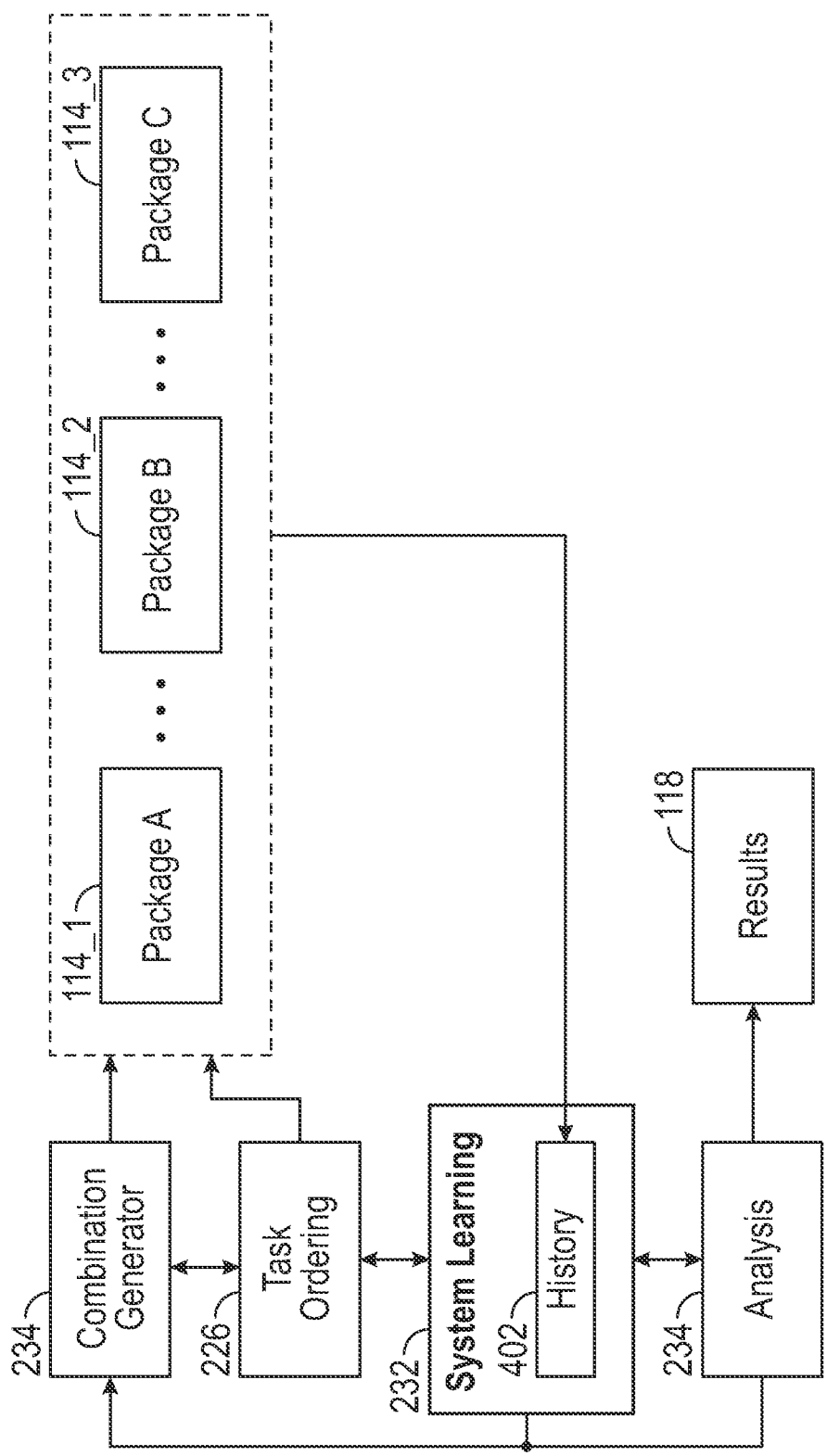
FIG. 4 is a module and process interaction diagram showing modules from the system of FIG. 2 performing iterative processes relating to FIGS. 1 and 3 in accordance with some embodiments.

FIG. 4 is a schematic diagram showing modules from the system of FIG. 2 performing iterative processes relating to FIGS. 1 and 3 in some embodiments. The combination generator module 224 produces the exhaustive list of all possible combinations of aspects of the task environment initially. If there is history 402 from previous runs, the system learning module 232 cooperates with the task ordering module 226 in order to select a starting set of task environments 114-1, 114-2, 114-3. The application is loaded into each of these, and executed and results of execution become part of the history 402. The analysis module 234 can cooperate with the system learning module 232 in cases of failure of execution of the application, to reduce the matrix search scope as described above. This mechanism influences the selection by the task ordering module 226 and the combination generator module 224 of the next task environment(s). The system iterates the creation of the task environments, the execution of the application, the recording of the history 402, and so on. The analysis module 234 produces or updates the result 118 on an ongoing basis, e.g., reporting passes or fails or diagnostic information in each iteration, and/or upon completion.

With reference to FIGS. 1-4, initially, the search matrix scope includes all possible combinations of the task environment 114, as generated by the combination generator module 224. That is, it is initially intended that all possible combinations of the task environment 114 will have the application executed during the upcoming tests. Each time an application is executed in a task environment, that task environment is noted as belonging to the completed search scope, i.e., a completed test is so noted as within the scope of the completed search. This information can be recorded as history 402 in the database 222. The completed search scope is the scope of the task environments in which the application has been tested, i.e., a test of the application has been completed. When an application fails in a task environment, or when a trend of failure is observed by the trending process 304, the cull/prune process 306 can reduce the matrix search scope. That is, combinations of aspects involving a particular aspect, such as a version of an operating system or a library, can be removed from the scope of task environments to be tested. In this manner, reducing the matrix search scope stops the testing sooner and avoids wasting test time on combinations of aspects involving the particular aspect that has already seen failures. At any time in this process, the matrix search scope (whether unreduced as original, or reduced by calling or pruning) represents the set of combinations of aspects of the task environment that are intended to be tested. The completed matrix search scope represents the set of combinations of aspects of the task environment that have actually been tested.

When the completed search scope is greater than or equal to the matrix search scope, testing can stop. Equivalently, when the matrix search scope is less than or equal to the completed search scope, testing can stop. In other words, if all of the task environments intended to be tested have actually been tested, there is no need for further testing. There are two cases provided for consideration to further explain the embodiments. A first case, in which the matrix search scope is not reduced, has the matrix search scope equaling all of the possible combinations of aspects of the task environment. In this first case, when the application has been tested in all of the possible combinations of aspects of the task environment, the completed search scope is equal to the matrix search scope and testing can stop. A second case, in which the matrix search scope is reduced by culling or pruning, has the matrix search scope less than all of the possible combinations of aspects of the task environment. In this second case, testing stops when at least all of the combinations in the reduced matrix search scope have been tried, i.e., when the application has been tested in the combinations of aspects of the task environment that are included in the reduced matrix search scope. The completed search scope could be equal to the matrix search scope at that time. Alternatively, if some paths that have already been tested have nonetheless been removed in the culling of the matrix search scope, the reduced matrix search scope could be less than the completed search scope. These search scopes are tracked in the database 222, in some embodiments. For example, a node structure, a tree structure, flags, indicators or annotations associated with each of the combinations 112 of aspects of the task environments 114 could be employed in the database 222 for such tracking. These or other mechanisms could indicate membership of a particular combination 112 of aspects of a task environment 114 in the matrix search scope or the completed search scope, i.e. indicate whether or not that combination 112 of aspects has been culled or tested.

Figure 5:
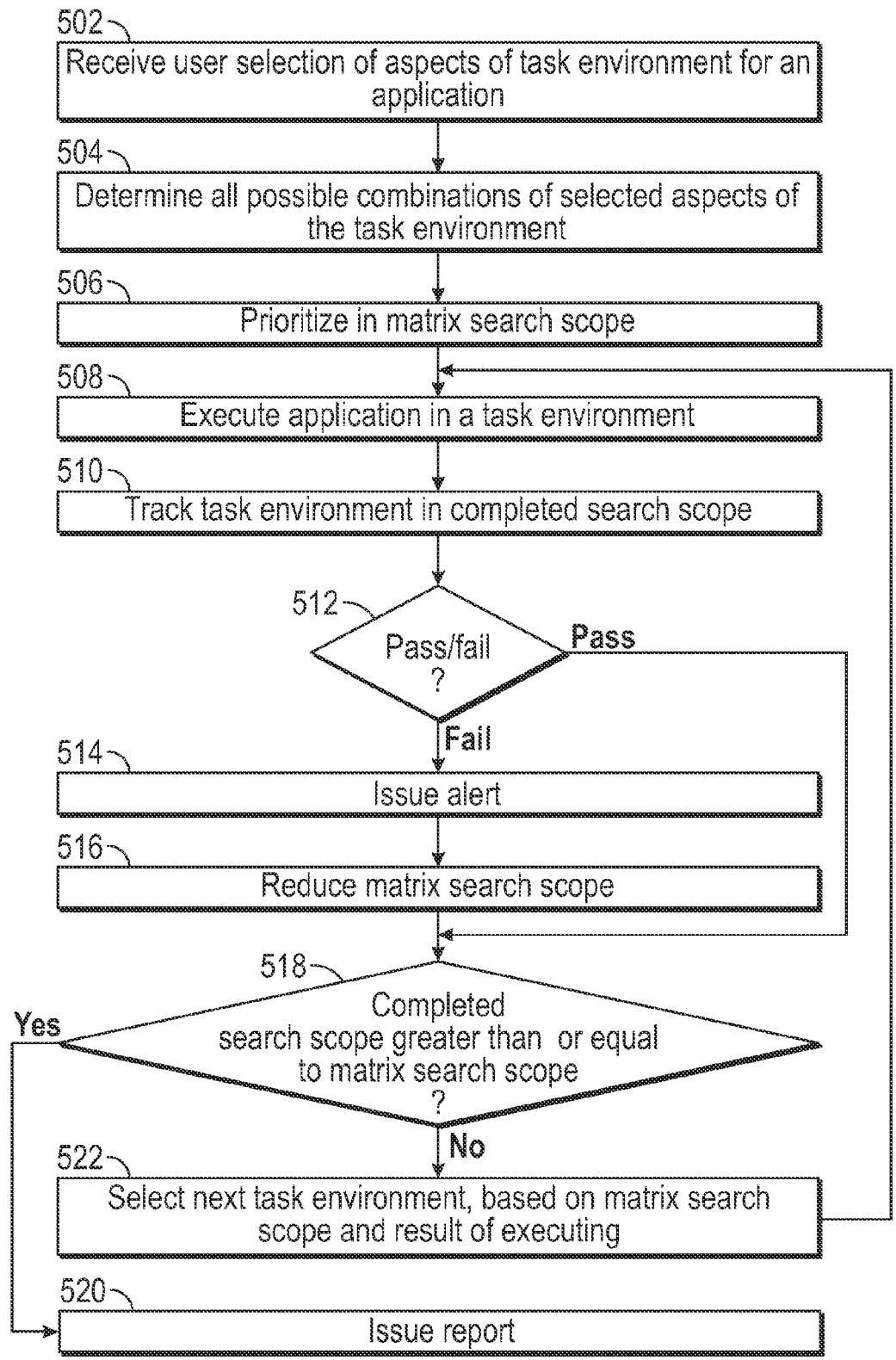
FIG. 5 is a flow diagram of a method for optimized dynamic matrixing of software environments for application test and analysis, which can be performed on or by the system of FIG. 2 in accordance with some embodiments.

FIG. 5 is a flow diagram of a method for optimized dynamic matrixing of software environments for application test and analysis, which can be performed on or by the system of FIG. 2. Some or all of the actions of the method can be performed by a processor, such as a processor in a computing device, a server or a network appliance, with the processor coupled to physical resources of either a physical computing environment or a virtual computing environment. A user selection of aspects of a task environment for an application is received, in an action 502. For example, the user could select these aspects using a graphical user interface, a command line interpreter, or a file. These aspects could include one or more specific platforms, libraries, components, operating systems, patches, updates, versions, browser types, browser versions or other items, as aspects of a task environment in which the application is to be tested. All possible combinations of selected aspects of the task environment are determined, in an action 504. This represents the initial matrix search scope. For example, these combinations could be created by a combination generator module in an optimization engine. The combinations could be written to a database.

In an action 506 of FIG. 5, the combinations are prioritized in the matrix search scope. For example, a sequence of task environments could be established, and noted in the database. This sequence could be based on past runs and system learning gained as to which aspects are most critical to test early on or which aspects consume fewer resources and are thus easier to test in parallel, or various further criteria. Where throttling is applied, the prioritizing can arrange for multiple task environments to be created, arranged or allocated for testing the application in parallel across the multiple task environments, within throttled resource limits. The application is executed in a task environment, in an action 508. This mechanism could include executing multiple instantiations of the application, each in a respective task environment, for testing in parallel. The task environment is tracked in the completed search scope, in an action 510. For example, a mechanism in the database can be employed to indicate when a specific task environment is tested, and what the results of the testing are. The completed search scope includes all task environments that have been tested, i.e., that have had the application executed in the respective task environment.

In a decision action 512, it is determined whether the application passes or fails in the task environment. If the application passes, flow proceeds to the decision action 518. If the application fails, flow proceeds to the action 514. In the action 514, an alert is issued. The alert could be a message, and/or an entry in the database or a file, indicating failure of the application in the task environment. It should be appreciated that the individual outcome for an environment is not necessarily binary in nature, i.e., pass or fail. In some embodiments, there may be multiple tests that would run on each system. In this embodiment, a user might want to distinguish a failure threshold for which some of the culling of scope would apply. Other relevant information such as error messages and/or diagnostics can also be included. In some embodiments a snapshot of the failed environment is automatically triggered in response to a failure to support further inspection and/or analysis. The matrix search scope is reduced, in an action 516. For example, combinations of aspects that include an aspect that is associated with multiple failures could be removed from the matrix search scope by culling or pruning, so that no further testing is performed on such combinations. In the decision action 518, it is determined whether the completed search scope is greater than or equal to the matrix search scope. If the answer is yes, i.e., all combinations of aspects of a task environment that are intended to be tested have actually been tested, flow proceeds to the action 520, in which a report is issued. The report could summarize any failures or indicate that there were no failures in all of the combinations in some embodiments. The report could summarize reductions to the matrix search scope, or, equivalently, summarize the reduced matrix search scope if applicable. If the answer is no in decision action 518, flow proceeds to the action 522.

In the action 522, the next task environment is selected. This selection is based on the matrix search scope and the result of executing the application in the task environment(s). Flow proceeds back to the action 508, to execute the application in the next task environment. The above sequence of actions 508-522 is iterated until the decision action 518 branches out, which completes the process of testing the application in the task environments. The total number of task environments tested, and the total number of iterative cycles through the process is based on the matrix search scope. The matrix search scope starts out as the complete set of all possible combinations of selected aspects of the task environment, per the action 504, but can be reduced per the action 516 if there is one or more failure of the application in a task environment. The next task environment can be selected, in the action 522, by applying system learning and analysis, and tracked in the database. The above-described method can include parallelism in the testing of the application in task environments. Variations of the method can apply snapshotting, throttling and various further techniques and mechanisms as described herein.

Figure 6:
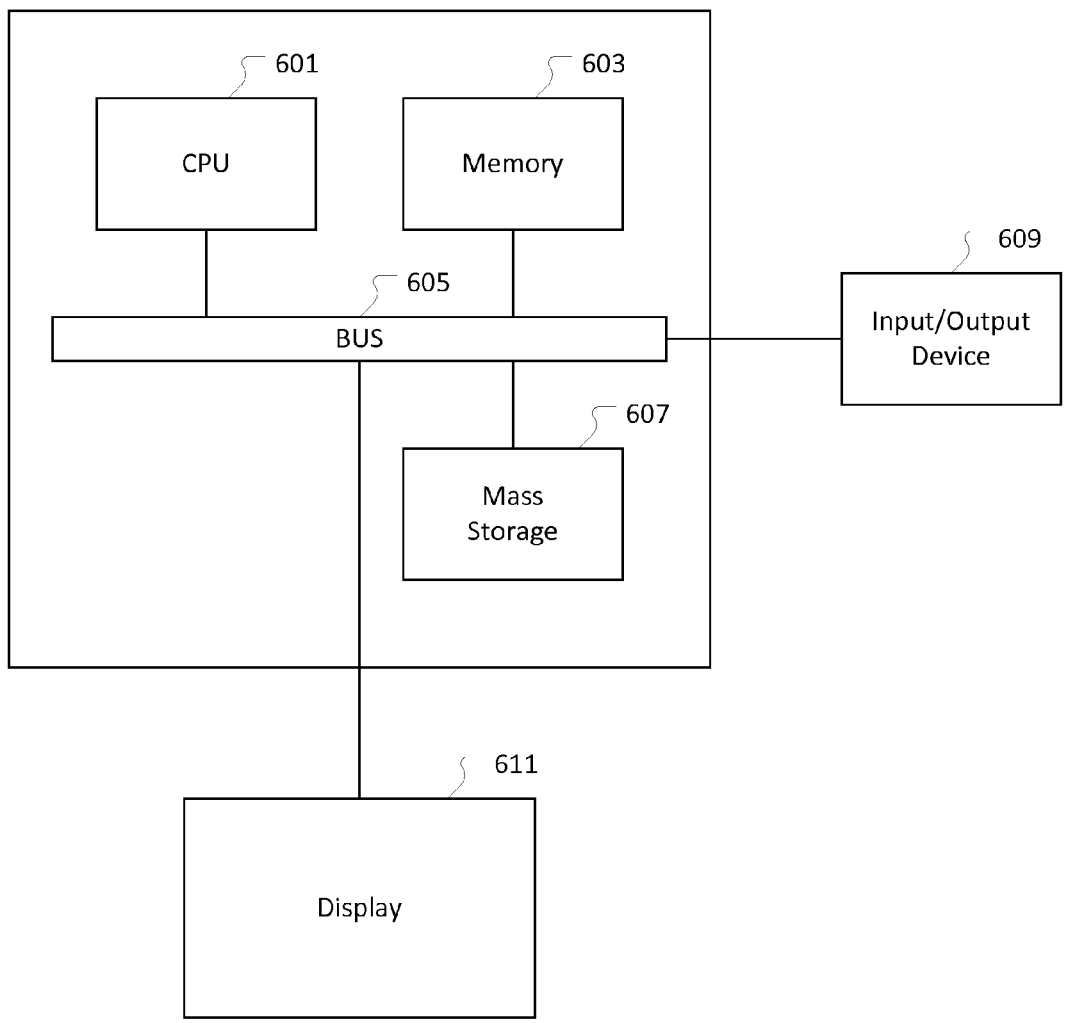
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for optimized dynamic matrixing of software environments for application test and analysis in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be MS-WINDOWS™, UNIX™, LINUX™, iOS™, CentOS™, Android™, Redhat Linux™, z/OS™, EMC ISILON ONEFS™, DATA ONTAP™ or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for matrixing of software environments, comprising:
   receiving a selection of a plurality of aspects of a task environment for an application;
   executing the application in a task environment selected from a set of all possible combinations of the plurality of aspects of the task environment;
   selecting a next task environment from the set of all possible combinations of the plurality of aspects of the task environment, based on a result of executing the application in the task environment;
   reducing a matrix search scope, responsive to a failure in the executing the application in the task environment; and
   repeating the executing, the selecting and the reducing until one of the matrix search scope as reduced, is less than or equal to a completed search scope, or the set of all possible combinations of the plurality of aspects of the task environment is in the completed search scope, wherein at least one action of the method is performed by a processor.

2. The method of claim 1, further comprising:
   generating the set of all possible combinations of the plurality of aspects of the task environment; and
   tracking which combinations from the set of all possible combinations of the plurality of aspects of the task environment are members of the completed search scope, based on the executing the application in the task environment.

3. The method of claim 1, further comprising:
   prioritizing at least a subset of combinations of the aspects of the task environment from among the set of all possible combinations of the plurality of aspects of the task environment, based on a result of a previous test.

4. The method of claim 1, further comprising applying a snapshot to revert to a clean task environment.

5. The method of claim 1, further comprising setting a limit, for each cycle of the repeating, on a number of virtual machines, an amount of resources, or a ratio of resources as compared to a total amount of resources, wherein the repeating includes:

creating virtual machines in parallel or allocating resources in parallel, up to the limit;

executing applications in task environments in parallel, up to the limit; and destroying the virtual machines created in parallel, or deallocating the resources allocated in parallel, in preparation for a next cycle of the repeating.

6. The method of claim 1, further comprising:

identifying which task environments require more resources as compared to other task environments, based on at least one previous test;

selecting parallel task environments which fit within resource throttling, based on the identifying; and applying the parallel task environments to the executing and the repeating.

7. The method of claim 1, further comprising:

identifying files in common across shared libraries in the aspects of the task environment, wherein reducing the matrix search scope is further responsive to the identifying the files in common.

8. A tangible, non-transitory, computer-readable media having instructions thereupon which, when executed by a processor, cause the processor to perform a method comprising:

receiving a selection of a plurality of aspects of a task environment for an application;

executing the application in a task environment intelligently selected from a set of all possible combinations of the plurality of aspects of the task environment;

selecting a next task environment from the set of all possible combinations of the plurality of aspects of the task environment, based on a result of executing the application in the task environment;

reducing a matrix search scope, responsive to a failure in the executing the application in the task environment; and repeating the executing, the selecting and the reducing until one of the matrix search scope as reduced, is less than or equal to a completed search scope, or the set of all possible combinations of the plurality of aspects of the task environment is in the completed search scope.

9. The computer-readable media of claim 8, wherein the method further comprises:

generating the set of all possible combinations of the plurality of aspects of the task environment; and tracking which combinations from the set of all possible combinations of the plurality of aspects of the task environment are members of the completed search scope, based on the executing the application in the task environment.

10. The computer-readable media of claim 8, wherein the method further comprises:

prioritizing at least a subset of combinations of the aspects of the task environment from among the set of all possible combinations of the plurality of aspects of the task environment, based on a result of a previous test.

11. The computer-readable media of claim 8, wherein the method further comprises applying a snapshot to revert to a clean task environment.

12. The computer-readable media of claim 8, wherein the method further comprises setting a limit, for each cycle of the repeating, on a number of virtual machines, an amount of resources, or a ratio of resources as compared to a total amount of resources, wherein the repeating includes:

creating virtual machines in parallel or allocating resources in parallel, up to the limit;

executing applications in task environments in parallel, up to the limit; and destroying the virtual machines created in parallel, or deallocating the resources allocated in parallel, in preparation for a next cycle of the repeating.

13. The computer-readable media of claim 8, wherein the method further comprises:

identifying which task environments require more resources as compared to other task environments, based on at least one previous test;

selecting parallel task environments which fit within resource throttling, based on the identifying; and applying the parallel task environments to the executing and the repeating.

14. The computer-readable media of claim 8, wherein the method further comprises:

identifying files in common across shared libraries in the aspects of the task environment, wherein reducing the matrix search scope is further responsive to the identifying the files in common.

15. An apparatus for matrixing of software environments, comprising:

a processor, programmed to perform actions including receiving a selection of a plurality of aspects of a task environment for an application;

a workflow engine, configured to execute the application in a task environment selected from a set of all possible combinations of the plurality of aspects of the task environment;

an optimization engine configured to select a next task environment from the set of all possible combinations of the plurality of aspects of the task environment, based on a result of executing the application in the task environment, the optimization engine further configured to reduce a matrix search scope, responsive to a failure in the executing the application in the task environment; and the workflow engine and the optimization engine configured to cooperate to repeat the executing the application, the selecting the next task, and the reducing the matrix search scope until one of the matrix search scope as reduced, is less than or equal to a completed search scope, or the set of all possible combinations of the plurality of aspects of the task environment is in the completed search scope.

16. The apparatus of claim 15, further comprising:

a configuration and reporting module, configured to generate the set of all possible combinations of the plurality of aspects of the task environment; and the configuration and reporting module configured to track which combinations from the set of all possible combinations of the plurality of aspects of the task environment are members of the completed search scope, based on the executing the application in the task environment.

17. The apparatus of claim 15, further comprising:

the optimization engine configured to prioritize at least a subset of combinations of the aspects of the task environment from among the set of all possible combinations of the plurality of aspects of the task environment, based on a result of a previous test.

18. The apparatus of claim 15, further comprising the optimization engine configured to apply a snapshot to revert to a prior task environment.

19. The apparatus of claim 15, further comprising the workflow engine configured to set a limit, for each cycle of the repeating, on a number of virtual machines, an amount of resources, or a ratio of resources as compared to a total amount of resources, wherein the repeating includes:
- creating virtual machines in parallel or allocating resources in parallel, up to the limit;
- executing applications in task environments in parallel, up to the limit; and
- destroying the virtual machines created in parallel, or deallocating the resources allocated in parallel, in preparation for a next cycle of the repeating.

20. The apparatus of claim 15, further comprising:
- the optimization engine configured to identify which task environments require more resources as compared to other task environments, based on at least one previous test;
- the optimization engine configured to select parallel task environments which fit within resource throttling, based on the identifying; and
- the workflow engine configured to apply the parallel task environments to the executing and the repeating.

\* \* \* \* \*